(12) United States Patent
Maier et al.

(10) Patent No.: US 10,534,762 B2
(45) Date of Patent: *Jan. 14, 2020

(54) DATA SAMPLING IN A STORAGE SYSTEM

(71) Applicant: International Business Machines Corporation, Armonk, NY (US)

(72) Inventors: Albert Maier, Tuebingen (DE); Yannick Saillet, Stuttgart (DE); Damir Spisic, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/409,534

(22) Filed: May 10, 2019

(65) Prior Publication Data

US 2019/0266136 A1    Aug. 29, 2019

Related U.S. Application Data

(63) Continuation of application No. 15/046,698, filed on Feb. 18, 2016.

(51) Int. Cl.
  *G06F 16/215*  (2019.01)
  *G06F 16/2453*  (2019.01)

(52) U.S. Cl.
  CPC ...... *G06F 16/215* (2019.01); *G06F 16/24539* (2019.01)

(58) Field of Classification Search
  CPC ............. G06F 16/215; G06F 16/24539; G06F 11/3072
  See application file for complete search history.

(56) References Cited

U.S. PATENT DOCUMENTS

| | | |
|---|---|---|
| 7,478,106 B2 | 1/2009 | Heckerman |
| 9,390,112 B1 | 7/2016 | Daly et al. |
| 2002/0124001 A1 | 9/2002 | Chaudhuri et al. |
| 2009/0248641 A1 | 10/2009 | Duan et al. |
| 2010/0281310 A1 | 11/2010 | Hou et al. |
| 2012/0179658 A1 | 7/2012 | Chaturvedi et al. |
| 2013/0006931 A1 | 1/2013 | Nelke et al. |
| 2013/0024430 A1 | 1/2013 | Gorelik |

(Continued)

OTHER PUBLICATIONS

Guha et al., "Large Complex Data: Divide and Recombine (D&R) with RHIPE," Stat, vol. 1, 2012, pp. 53-67, See Abstract.

(Continued)

*Primary Examiner* — Jesse P Frumkin
(74) *Attorney, Agent, or Firm* — Winstead, P.C.

(57) ABSTRACT

A computer-implemented method, computer program product and system for data sampling in a storage system. The storage system includes a dataset comprising records and a buffer. The dataset is scanned record-by-record to determine whether the current record belongs to a random sample. If so, then the current record may be added to a first set of records. Otherwise, at least one storage score may be calculated or determined for the current record using attribute values of the current record. Next, it may be determined whether the buffer includes available size for storing the current record. In case the buffer comprises the available size, the current record may be stored in the buffer. Otherwise, at least part of the buffer may be free up. A subsample of the dataset may be provided as a result of merging the first set of records and at least part of the buffered records.

20 Claims, 5 Drawing Sheets

(56) References Cited

U.S. PATENT DOCUMENTS

| | | |
|---|---|---|
| 2013/0073594 A1 | 3/2013 | Jugulum et al. |
| 2013/0297628 A1 | 11/2013 | George et al. |
| 2014/0229456 A1 | 8/2014 | Hollifield et al. |
| 2014/0245337 A1 | 8/2014 | Gildfind et al. |
| 2015/0006547 A1 | 1/2015 | Grant |
| 2015/0052269 A1 | 2/2015 | Schoonover et al. |
| 2015/0058280 A1 | 2/2015 | Nelke et al. |
| 2015/0095415 A1 | 4/2015 | White et al. |
| 2015/0100603 A1 | 4/2015 | Cipiere |
| 2015/0134591 A1 | 5/2015 | Staeben et al. |
| 2015/0134660 A1 | 5/2015 | Yan et al. |
| 2015/0234905 A1 | 8/2015 | Carasso et al. |
| 2016/0034391 A1 | 2/2016 | Bartik et al. |
| 2017/0024427 A1 | 1/2017 | Daly et al. |
| 2017/0242878 A1 | 8/2017 | Maier et al. |
| 2017/0372228 A1 | 12/2017 | Daly et al. |
| 2018/0150767 A1 | 5/2018 | Daly et al. |

OTHER PUBLICATIONS

List of IBM Patents or Patent Applications Treated as Related, May 16, 2019, pp. 1-2.

|  | Metric 1 | Metric 2 | ... | Metric N | Record Score |
|---|---|---|---|---|---|
| Record 1 | 1.0 | 0.0 | 0.0 | 0.25 | 1.25 |
| Record 1 | 0.5 | 0.90 | 0.0 | 0.0 | 1.4 |
| Record 1 | 1.0 | 0.25 | 1.0 | 1.0 | 3.25 |
| ... | 0.75 | 0.10 | 0.0 | 0.0 | 0.85 |
| Record n | 0.0 | 0.0 | 0.9 | 0.0 | 0.9 |
| Metric Score | 3.25 | 2.15 | 1.9 | 1.25 | |

Fig. 5

DATA SAMPLING IN A STORAGE SYSTEM

TECHNICAL FIELD

The present invention relates to the field of digital computer systems, and more specifically, to a method for data sampling.

BACKGROUND

Data scientists and more broadly "knowledge workers" spend a lot of their time preparing data for analysis. There are estimates that about 80% of processing resources are typically going into data preparation, only 20% into analytics. Thus, there is a trend in the industry to simplify data preparation and integrate it into analytic tools. Data can be shaped, cleansed and enriched by knowledge workers interactively and in the same environment that is used to explore the data and to run analytics.

In such an environment, the data to analyze can be large (e.g., the user might want to analyze a data set containing several million data records). State of the art data preparation technology is not able to support an interactive experience for larger data sets. The cost for such an environment would have prohibitive costs. Thus, interactive data preparation is performed on comparably small samples (e.g., 10,000 records).

SUMMARY

In one embodiment of the present invention, a computer-implemented method for data sampling in a storage system, the storage system comprising a dataset comprising records and a buffer, where the buffer is a region of a physical memory storage used to temporarily store data while it is being moved from one place to another, the method comprises scanning through the dataset record-by-record. The scanning comprises determining whether a current record belongs to a random sample. In case the current record belonging to the random sample, adding the current record to a first set of records. In case the current record does not belong to the random sample, determining at least one storage score for the current record using attribute values of the current record, and storing the storage score in a data table. The method further comprises determining whether the buffer comprises available size for storing the current record. In case the buffer comprises the available size, buffering the current record in the buffer. In case the buffer does not comprise the available size for storing the current record, freeing up at least part of the buffer by determining using storage scores whether at least one previous record of the previously buffered records fulfils a deletion criterion. Furthermore, in case the previous record fulfils the deletion criterion, replacing the previous record by the current record in the buffer. The method additionally comprises providing the first set of records and at least part of the buffered records as a subsample of the dataset.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which:

FIG. 5 shows a simplified structure of a data quality (DQ) table in accordance with an embodiment of the present invention.

DETAILED DESCRIPTION

Figure 1:
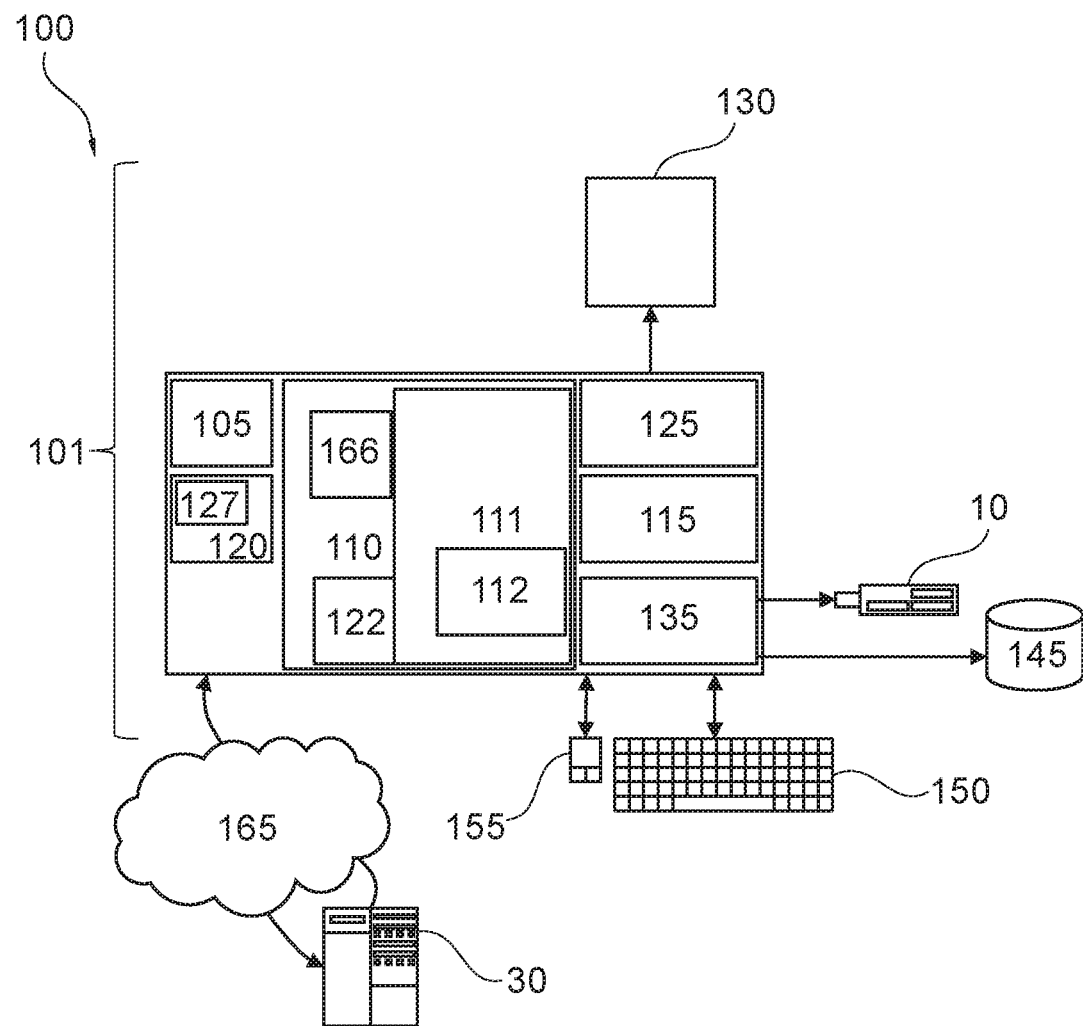
FIG. 1 represents a computerized system, suited for implementing one or more method steps as involved in the present disclosure in accordance with an embodiment of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present disclosure provides a sampling methodology that allows one to have up to a certain percentage of the overall sample (e.g., max 10%) chosen to reflect the typical characteristics of the data in the full dataset, such as issues in the full dataset (such as DQ issues). The rest of the subsample data is chosen to best reflect the characteristics of the data as needed for the intended analytics. Candidates for the final subsample are chosen during a single scan through the data. Candidates may be replaced if better candidates are identified.

The above features may have the advantage that a single sample, supporting both data analytics needs, is provided in a smaller size compared to the overall dataset. This may optimize the usefulness of the subsample (e.g., meaning the number and diversity of data quality issues that occur in the sample). The size of the sample is minimized while maintaining its usefulness. The random part is satisfying to see the real distribution of the data as they are in the full dataset. The other part of the subsample is there to guarantee that enough records having certain wanted characteristics are part of the subsample.

Another advantage may be that the subsample is determined in a single pass over the dataset as stored (e.g., on disk). This may save processing resources compared to the case where the dataset has to be re-accessed multiple times for selecting records that may be useful for an analysis. This single data pass may also make use of existing data processing that have to be performed on the dataset. For example, if the dataset is regularly sorted in the database for other purposes, the present method may make use of that sorting process in order to be executed during that the sorting process.

Another advantage may be that the present method may enable creating and testing governance data rules (e.g., on how to prepare a sample of data so that it contains records involving seldom issues.) And a data sample involving such records is needed to test governance data rules. Also the present method may enable data profiling (e.g., which records are potentially interesting for review). For that, a sample of the big data set and showing the sample to the user may be created.

According to one embodiment, the method further comprises providing of the subsample in association with metadata indicating whether a record of the subsample is a record of the random sample, and indicating for each buffered record of the subsample attribute values used for determining the storage score. This may have the advantage of enabling an accurate processing of the dataset using the subsample.

According to one embodiment, the determining that at least one previous record of the previously buffered records fulfils the deletion criterion comprises: comparing the storage score of the previous record with the storage score of the current record, and in case the storage score of the previous record is smaller than the storage score of the current record, determining that the previous record fulfils the deletion criterion. This may further increase the usefulness of the subsample.

According to one embodiment, the determining that at least one previous record of the previously buffered records fulfils the deletion criterion comprises: selecting the lowest storage score in the data table, comparing the lowest storage score with the storage score of the current record, and in case the lowest storage score of the previous record is smaller than the storage score of the current record, determining that the previous record having the lowest storage score fulfils the deletion criterion. This may further increase the usefulness of the subsample compared to the case where a randomly selected previous record may be removed based only on the comparison with the current record.

According to one embodiment, the determining that at least one previous record of the previously buffered records fulfils the deletion criterion comprises: determining an overall score for the buffered records using the storage scores; for each record of the buffered records recalculating the overall score without the storage score of the each record; in response to determining that the recalculated overall score is smaller than a predefined overall threshold, comparing the storage score of the previous record with the storage score of the current record, and in case the storage score of the previous record is smaller than the storage score of the current record, determining that the previous record fulfils the deletion criterion. This may further increase the usefulness of the subsample by providing an accurate and reliable method for defining the subsample.

According to one embodiment, determining the storage score for the current record comprising determining a storage score for each attribute value of the current record, thereby resulting in a set of storage scores of respective attributes of the current record. This may increase the selection accuracy of the records as it may be based not only on single scores but on multiple scores.

According to one embodiment, the determining that at least one previous record of the previously buffered records fulfils the deletion criterion comprises: combining the set of storage scores of the current record, and in case each storage score of the set of storage scores of the previous record is smaller than the combined storage score of the current record, determining that the previous record fulfils the deletion criterion.

According to one embodiment, the determining that at least one previous record of the previously buffered records fulfils the deletion criterion comprises: in case at least one selected storage score (of a given attribute) of the set of storage scores of the previous record is smaller than the corresponding storage score (of the given attribute) of the current record, determining that the previous record fulfils the deletion criterion.

According to one embodiment, the dataset being stored on a disk of the storage system. The single data scan for determining the subsample may be particularly advantageous when reading the data from low performance access storages, such as disks. This may speed up the process of the present method.

According to one embodiment, in case the buffer comprises the available size, buffering the current record in the buffer comprises determining that the storage score of the current record is higher than a predefined threshold and buffering the current record. This may prevent filling the buffer with useless records and may thus save processing resources that may be required for frequently reducing the size of the buffer because of adding records without any preselection.

FIG. 1 represents a general computerized system, suited for implementing method steps as involved in the disclosure in accordance with an embodiment of the present invention.

It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software 112, 122 (including firmware 122), hardware (processor) 105, or a combination thereof. In exemplary embodiments, the methods described herein are implemented in software, as an executable program, and is executed by a special or general-purpose digital computer, such as a personal computer, workstation, minicomputer, or mainframe computer. The most general system 100 therefore includes a general-purpose computer 101.

In exemplary embodiments, in terms of hardware architecture, as shown in FIG. 1, the computer 101 includes a processor 105, memory 110 coupled to a memory controller 115, and one or more input and/or output (I/O) devices (or peripherals) 10, 145 that are communicatively coupled via a local input/output controller 135. The input/output controller 135 can be, but is not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein, the I/O devices 10, 145 may generally include any generalized cryptographic card or smart card known in the art.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing software instructions.

The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM)). Note that the memory 110 can have a distributed architecture, where various components are situated remote from one another, but can be accessed by the processor 105.

The software in memory 110 may include one or more separate programs, each of which comprises an ordered listing of executable instructions for implementing logical functions, notably functions involved in embodiments of this invention. In the example of FIG. 1, software in the memory 110 includes instructions 112 (e.g., instructions to manage databases, such as a database management system). The memory 110 may further comprise a query optimizer. The query optimizer may comprise instructions (e.g., software instructions that when executed may provide a query execution plan for executing a given query).

The software in memory 110 shall also typically include a suitable operating system (OS) 111. The OS 111 essentially controls the execution of other computer programs, such as possibly software 112 for implementing methods as described herein.

The methods described herein may be in the form of a source program 112, executable program 112 (object code), script, or any other entity comprising a set of instructions 112 to be performed. When a source program, then the program needs to be translated via a compiler, assembler, interpreter, or the like, which may or may not be included within the memory 110, so as to operate properly in connection with the OS 111. Furthermore, the methods can be written as an object oriented programming language, which has classes of data and methods, or a procedure programming language, which has routines, subroutines, and/or functions.

In exemplary embodiments, a conventional keyboard 150 and mouse 155 can be coupled to the input/output controller 135. Other output devices, such as the I/O devices 145, may include input devices, for example but not limited to a printer, a scanner, microphone, and the like. Finally, the I/O devices 10, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 145 can be any generalized cryptographic card or smart card known in the art. The system 100 can further include a display controller 125 coupled to a display 130. In exemplary embodiments, the system 100 can further include a network interface for coupling to a network 165. The network 165 can be an IP-based network for communication between the computer 101 and any external server, client and the like via a broadband connection. The network 165 transmits and receives data between the computer 101 and external systems 30, which can be involved to perform part or all of the steps of the methods discussed herein. In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network, such as a local area network, wide area network, metropolitan area network, Internet network, or other similar type of network environment. The network 165 may be a fixed wireless network, a wireless local area network (LAN), a wireless wide area network (WAN), a personal area network (PAN), a virtual private network (VPN), intranet or other suitable network system and includes equipment for receiving and transmitting signals.

If the computer 101 is a PC, workstation, intelligent device or the like, the software in the memory 110 may further include a basic input output system (BIOS) 122. The BIOS is a set of essential software routines that initialize and test hardware at startup, start the OS 111, and support the transfer of data among the hardware devices. The BIOS is stored in ROM so that the BIOS can be executed when the computer 101 is activated.

When the computer 101 is in operation, the processor 105 is configured to execute software 112 stored within the memory 110, to communicate data to and from the memory 110, and to generally control operations of the computer 101 pursuant to the software. The methods described herein and the OS 111, in whole or in part, but typically the latter, are read by the processor 105, possibly buffered within the processor 105, and then executed.

When the systems and methods described herein are implemented in software 112, as is shown in FIG. 1, the methods can be stored on any computer readable medium, such as storage 120, for use by or in connection with any computer related system or method. The storage 120 may comprise a disk storage unit, such as HDD storage.

The storage 120 may comprise at least one dataset (or data table) 127. For example, the software 112 may receive (automatically or upon request) as input the data table 127, or may download the data table 127 from storage 120.

The computer 101 may further comprise a buffer 166. In one example, the buffer may be part of the memory 110.

Figure 2:
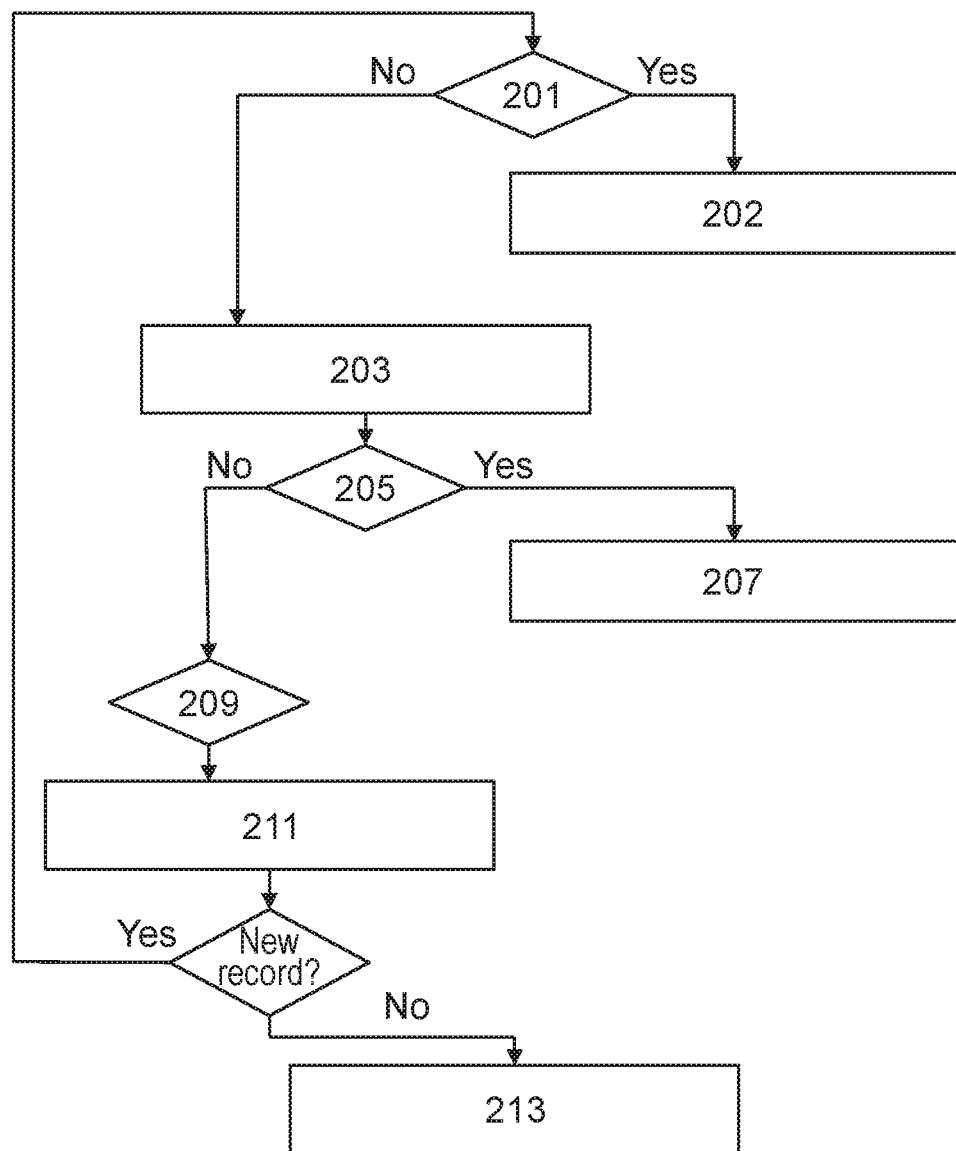
FIG. 2 is a flowchart of a method for data sampling in a storage system in accordance with an embodiment of the present invention.

FIG. 2 is a flowchart of a method for data sampling in a storage system (e.g., system 100) in accordance with an embodiment of the present invention. The storage system comprises a dataset comprising records and a buffer (e.g., 166).

The term "buffer" as used herein refers to a region of a physical memory storage (e.g., 110) used to temporarily store data while it is being moved from one place to another.

The dataset may be stored on a disk of the storage system or may be stored on another storage device of the storage system. The other storage device may have a lower data access performance compared to the buffer. The data access performance comprises speed of the data access and/or input/output operations per time interval and/or a latency for each of read operations.

The term "dataset" as used herein refers to a collection of data such as, for example, a data table, files in a structured format or a list. The collection of data may be presented in tabular form. Each column may represent a particular variable or attribute. Each row may represent a given member, record or entry of the dataset.

The dataset may be record-by-record scanned for the data sampling in order to generate a subsample of data. The record-by-record scanning of the dataset may be performed as follows for each record of the dataset (e.g., steps 201-211 may be repeated for each record in the dataset until the dataset is fully processed).

In inquiry 201, it is determined whether the current record belongs to a random sample. The current record may be the record of the dataset being currently scanned or read or accessed. A random sample may be defined by randomly selecting a random list records of the dataset. For example, a random number may be calculated for the current record and the decision on whether the current record is taken for the random sample is taken based on the generated number (e.g., by comprising the generated random number with a predefined reference value).

Inquiry 201 may comprise determining whether the current record is within the selected random list of records. In another example, the determining whether the current record belongs to a random sample may dynamically be performed based on a random selection criterion.

In case the current record belongs to the random sample, the current record may be added in step 202 to a first set of records or may be added to the subsample directly. The first set of records and/or the subsample may be stored on the disk where the dataset is stored or on other storage devices.

In case the current record does not belong to the random sample, steps 203-211 may be performed.

In step 203, at least one storage score is determined or calculated for the current record using attribute values of the current record. The storage score may be a score indicating how interesting a record is to be included in the subsample. The storage score may, for example, indicate the level of violation of one or more DQ measures (e.g., the storage score reflects the data quality issues or issues of other attributes of interest). In another example, the storage score may indicate the level of the data quality agreement or compliance. In another example, the storage score may indicate how seldom the value combination represented by the current record is.

The storage score may also be calculated for the records selected for the random sample (i.e., step 203 may further comprise computing the storage score of the current record).

The storage score may, for example, be determined using data quality measures measuring characteristics of data of the dataset. The data quality measures may, for example, comprise completeness which measures or evaluates the missing values for a specific attribute in a record. For example, for measuring the completeness of a given attribute (ATT) value of a record of the dataset, a reference value of the attribute may be used (e.g., ref(ATT)), and the completeness may be defined as the ratio of the attribute value to the reference value (i.e., value(ATT)/ref(ATT)).

In another example, the completeness may be defined as the percentage % of specified values in the record with respect to the total number of attributes in the records. For example, if the record has 5 attributes and one attribute has NULL value, then the completeness in this case is 80% (i.e., ⅘).

The data quality measures may further comprise uniqueness that measure the number of same values of a unique attribute. For example, if two users have the same ID this constitutes a uniqueness violation as the unique attribute "ID" has two same values.

Other DQ measures may be used to measure characteristics of data.

The storage score may be determined or calculated using the DQ measures. Assuming, for exemplification purpose, that there are three DQ measures: DQM1, DQM2 and DQM3, and the current record has a single attribute ATT. Each DQ measure of at least part of the DQ measures may be evaluated or measured for the attribute value of attribute ATT. For example, DQM1 and DQM3 (less or more DQ measures may also be used) may be evaluated resulting in respective DQ metrics (i.e., DQ metric 1 and DQ metric 2).

The storage score may be defined using the DQ metric 1 and/or DQ metric 2 (e.g., by summing the two DQ metrics, etc.).

The storage score may be determined by involving the current record only (e.g., by summing or averaging the two DQ metrics DQ metric 1 and DQ metric 2 calculated using attribute values of the current record only). This storage score may be referred to as the individual storage score. Alternatively or additionally, the storage score may involve the current record as well as records previously buffered or previously processed (e.g., records for which the DQ scores are stored in the DQ table 501). This may, for example, be performed by summing the DQ metric 1 for every record previously scanned and buffered with the DQ metric 1 of the current record. This storage score involving multiple records may be referred to as an overall storage score.

The calculated or determined storage score may be stored in a data table (e.g., in 501 as shown with reference to FIG. 5). The data table 501 may or may not comprise storage scores for the records of the random sample.

It is determined (inquiry 205) whether the buffer comprises available size for storing the current record.

In case the buffer comprises the available size, the current record may be buffered or stored in the buffer in step 207. The buffering may optionally be performed under the condition that the storage score of the current record is higher than a predefined DQ threshold (referred to as the "predefined threshold" above). Using the above example, every DQ measure may be associated with a respective threshold for selecting the records. The DQ threshold may be determined using at least part of the thresholds of the DQ measures. Examples of such thresholds are provided below.

In case the buffer does not comprise the available size for storing the current record, at least part of the buffer may be free up by determining in inquiry 209 using the storage scores whether at least one previous record of the previously buffered records fulfils a deletion criterion.

For the reduction of the buffer size, the storage score as defined above may be used. For example, the individual storage score may be used by comparing (one to one) the individual storage score of the current record with the individual storage score of a previously buffered record.

The deletion criterion may, for example, comprise "the storage score of a previous record is worse (e.g., smaller) than the storage score of the current record."

In another example, the lowest storage score in the data table 501 may be identified, and the lowest storage score may be compared with the storage score of the current record, and in case the lowest storage score of the previous record is smaller than the storage score of the current record, determining that the previous record having the lowest storage score fulfils the deletion criterion.

In a further example, a given previous buffered record whose contribution to the overall storage score is low may be removed from the buffer. In other words, assuming that K records have previously been buffered (i.e., the overall storage score (OVS) of the K records OVS (K) is stored in the data table 501) by recalculating the overall storage score involving all previously buffered records without contribution of the given previously buffered record (OVS(K−1)) and if the recalculated overall storage score is still high enough (e.g., higher than a predetermined overall scoring threshold (or the overall threshold)), then the given previous record is fulfilling the deletion condition and can be replaced by the current record. This further example performed for the given previous buffered record may be performed for any record of the previously buffered records. In another example, the given buffered record may be the record whose contribution to the OVS(K) is the smallest one. This method may be applied from more than one given previous buffered records (e.g., by recalculating OVS(K−i), where i>=1). This example may be advantageous as only the data table 501 may be required to perform such a method. The data table 501 may be advantageously stored on the memory 110 of the storage system.

In case the previous record fulfils the deletion criterion, the previous record may be replaced in step 211 by the current record in the buffer. This may be done if the available size after removing the previous record is sufficient for storing the current record, otherwise inquiry 209 (i.e., finding another record that can be deleted if only one is found in the first execution of inquiry 209) may be repeated to find another previous record, such that when both previous records are removed, the current record can be stored on the buffer. In case more than one of the previously buffered records are identified to fulfil the deletion condition, the current record may replace only part of the identified records that is enough when removed to free up available space for storing the current record.

In step 213 (e.g., after processing all records of the dataset) the random sample and at least part of the buffered records may be provided as the subsample of the dataset. The subsample may be provided in association with metadata indicating whether a record of the subsample is a record of the random sample, and indicating for each of the buffered records of the subsample attribute values or measures used for determining the storage score. In other words, each record coming into the subsample may be associated with the information indicating why it is in the subsample (random, or the information about the record that lead to the storage score).

The at least part of the buffered records may be selected as described below with reference to step 305.

In the following, further details of another example regarding the random sample and a sampling methodology will be described.

In order to satisfy the goals of obtaining a representative sample the full dataset (e.g., 127) as well as representing data quality violations, a unified subsample S may be obtained in a single data pass. The subsample S includes randomly selected records and records (e.g., chosen due to their data quality violations). The subset of records in subsample S chosen due to their data quality violations may be referred to as a data quality set (DQS). The size of DQS is limited to a desired number of records or their percentage relative to the desired size of the subsample S. DQS may typically contain at most 10% of the subsample S.

The records selected randomly in order to obtain a representative sample for the data distribution may also contain data quality violations. Any violations found in randomly selected records may also be registered (e.g., in the metadata described above), and they influence selection of records kept exclusively for data quality violations.

Therefore, DQS may depend on the randomly selected records in subsample S and it normally contains fewer records than if it were selected independently. This makes the overall subsample S a better representation of the data distribution while exhibiting the same amount of data quality violations.

While randomly selected records can be saved directly in the output subsample S, a DQS buffer (e.g., the buffer 166) is used in order to be able to select an optimal set of records containing the data quality violations. For that, an auxiliary data structure 501 called DQ table to collect and maintain the data quality information for all selected records may be used. In the end, DQS may be extracted from the DQS buffer using size and quality constraints and add it to the randomly selected records in the subsample S.

Each record of the subsample S is internally tagged with information why it has been chosen. Thus, an integrated data preparation and analytic tool can show users a single sample during data preparation and cleansing, but could still offer an analytic test run capability that works on a "high quality subset" of the sample only. This may be useful if the user wants to intertwine cleansing and getting a glimpse of potential results.

In the following, further details regarding the DQ metrics will be described.

A set of DQ measures may be used for every field or attribute in the given dataset. The DQ measures that apply for a particular attribute may be a subset of all considered DQ measures and depend on the possible type and class of the attribute.

For each DQ measure and each attribute, there is a number of specific data quality violations in the data. More generally, a data quality (violation) score between 0 and 1 may be assigned to each data quality violation based on their severity, degree, confidence or other factors. Score 0 stands for no violation, while score 1 is assigned to a certain violation. It is also introduced a threshold for the minimal sum of the data quality scores per each DQ measure that is required to be present in the subsample S.

The following is an example of possible list of DQ measures and their corresponding score contributions that are used to evaluate the record score 505 of each of the records.

1. Completeness—1. In this case, the record score of the record is increased by 1 per each missing value specification in the attribute values of the record.

2. Imbalance or Too many categories—1 per category with frequency<5% (up to 30). In this case, the record score may be increased for the record by 1 each time a field or attribute value of the record is seldom (the value as seen in the record is at most seen in 5% of the values in the whole field).

3. Outliers—5 high and 5 low values. In this case, the record score is increased by 5 if the value in a record represents an outlier compared to all values in the whole table in the same field.

4. Domain violations—10. In this case, the record score of a record is increased by 10 in case of domain violations in the record.

5. Suspect domain violations—5. In this case, the record score of a record is increased by 5 in case of suspect domain violations in the record.

6. Uniqueness violations—10. In this case, the record score of a record is increased by 10 if a field is supposed to contain only unique values but the record has a value for that field which is not unique.

7. Non-standardized missing values—5. In this case, the record score of a record is increased by 5 in case of existing non-standardized missing values in the record. Thresholds may be defined for each of the measures and/or a combination of the measures using the above defined scores. For example, if the outliers measure is used the threshold may be equal to 20 or other values.

Figure 3:
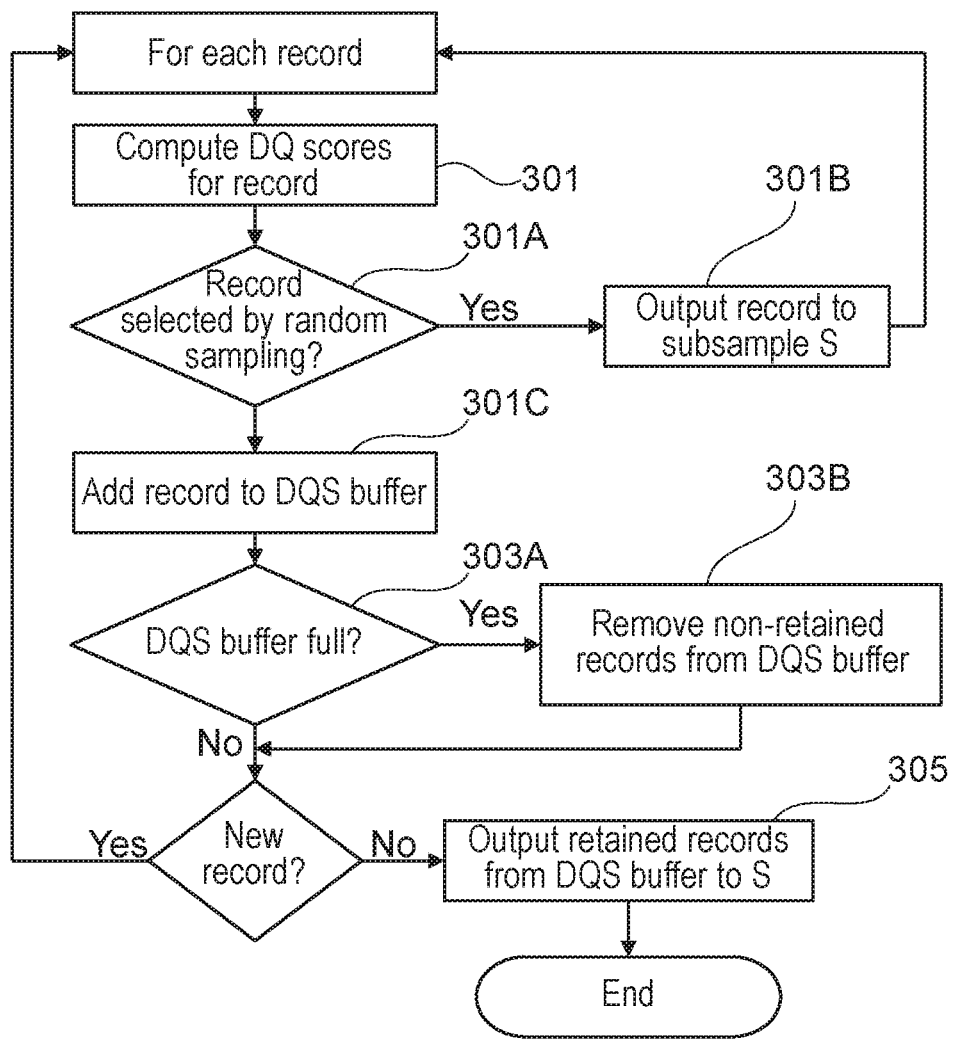
FIG. 3 is flowchart of a sampling algorithm in accordance with an embodiment of the present invention.

FIG. 3 is flowchart of a sampling algorithm in accordance with an embodiment of the present invention.

In this algorithm, random records for subsample S may be extracted by the proportional simple sampling.

Steps 301, 301A-301C (and 303A-303B) are applied for each record in the dataset. Periodically, when the DQS buffer fills up, step 303B is applied. At the end, step 305 is performed to obtain the subsample S including records from DQS. The final subsample S may both be representative of the overall data distribution for analytic purposes and it contains relevant examples of data quality violations.

Step 301 comprises computing DQ score for the current record. If current record (inquiry 301A) is selected by random sampling, the current record may be added (step 301B) to the subsample S and optionally update the metric scores in the DQ Table 501 by inserting a new entry (with new metric scores) for the current record. Otherwise, the current record may be added in step 301C to the DQS buffer 166 and DQ scores may be added for the current record into the DQ Table 501.

It is determined (inquiry 303A) whether the DQS buffer is full (e.g., no available space for storing the current record). In case the DQS buffer is full, the number of records in the DQS buffer 166 may be reduced in step 303B. For that, the DQ Table 501 may be sorted in step 303B by ascending Record Score 505. The individual storage score described above may comprise record score 505. The reducing of the number of records may, for example, comprise removing only one or more records to free up just enough storage space to store the current record. In step 303B, removing a record from the DQS buffer may also require removing the corresponding DQ scores row from the DQ Table 501. The Metric Scores as shown in DQ table 501 are updated as well. For example, a record is retained in the DQS buffer if its removal from the DQS buffer reduces any Metric Score below its corresponding threshold.

And starting from the top row of the DQ table 501 the following steps may be repeated for each row (e.g., until enough space on the DQS buffer is free for storing the current record). If (inquiry 303A) corresponding record of the row is not retained in the DQS buffer 166, then the record may be removed (step 303B) from the DQS buffer and the DQ Table 501 may be updated (e.g., by removing the row and recalculating the metric scores). Otherwise, moving to the next DQ Table row until the end of the table. If the number of records in the DQS buffer is not reduced, all given DQ metrics score thresholds may be reduced (e.g., by 1) and steps 303A and 303B may be repeated.

In step 305, the DQS records may be output as follows by reducing the DQS buffer to contain fewer than N records. For that, steps 303A and 303B (or deletion criterion described above) may be executed (or repeated as described above) until the DQS buffer contains fewer than N records. And the remaining records may be added from DQS buffer 166 to the subsample S.

Figure 4:
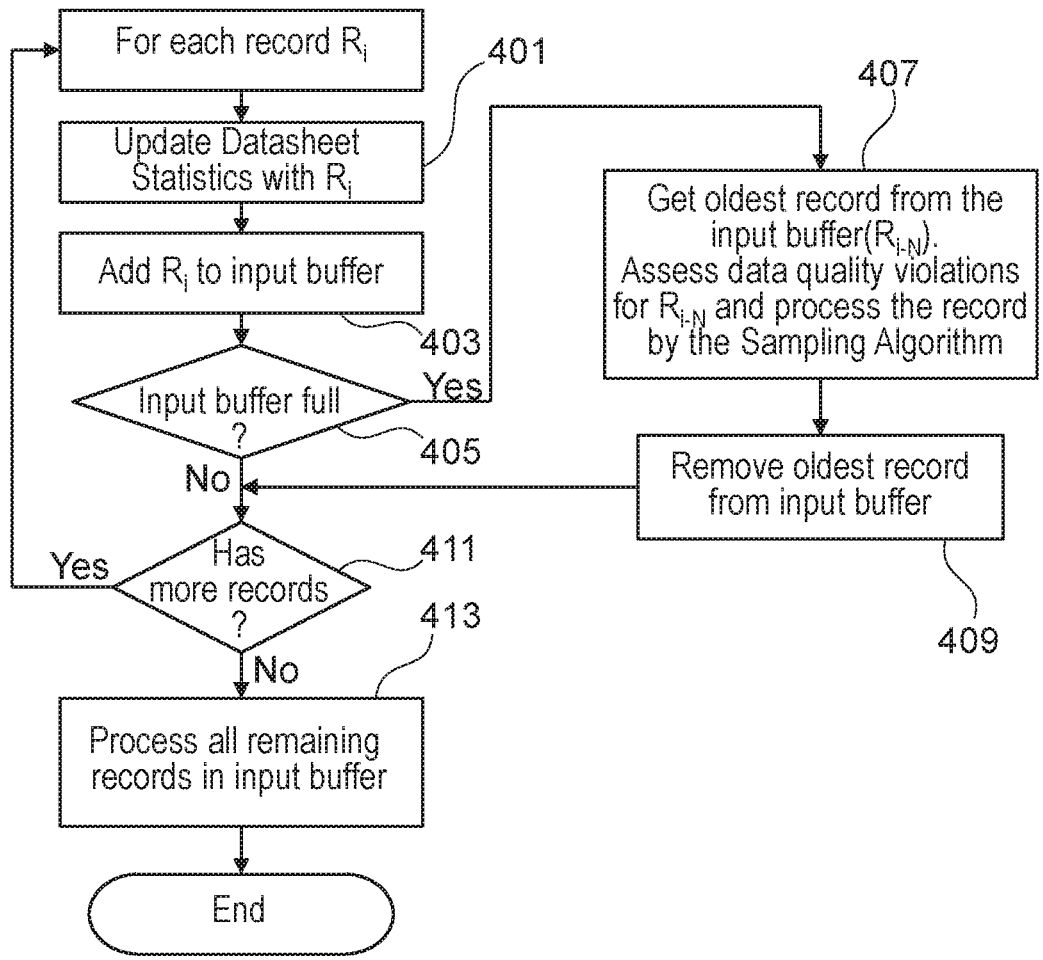
FIG. 4 is a flowchart of a method for computing dataset statistics in accordance with an embodiment of the present invention.

FIG. 4 is a flowchart of a method for computing dataset statistics in accordance with an embodiment of the present invention.

Identifying data quality violations may sometimes depend on summary dataset statistics for the corresponding data. This information may be available prior to considering the data quality or application of analytics. It can be included as a part of the metadata information. However, there are situations when this is not the case and the dataset statistics need to be computed along with assessment of data quality violations.

FIG. 4 describes an approach for computing and using the dataset statistics dynamically. It can be applied within the same data pass as the sampling algorithm described above with reference to FIG. 3. It allows obtaining the subsample S even when the dataset statistics are required for computing DQ scores, but are not available prior to the sampling data pass.

For each record of the dataset 127, the dataset statistics may be updated in step 401, and the current record Ri may be added in step 403 to an input buffer. The dataset statistic may be data necessary to compute the DQ metrics 503. Using the above example concerning the DQ measure of outliers, which consist of detecting how far a value is from the expected range of normal values. Testing whether a value is an outlier or not implies that the distribution of all values is known (ex: mean and standard deviation of all values of a field or attribute). These distribution values form part of the dataset statistics that can be associated to the record and/or full dataset. If these dataset statistics are not known for the full dataset, they are calculated on the fly as described with reference to step 401. For example, the dataset statistics is record dependent and it may be determined on the fly for each record, otherwise, it may be determined at once (e.g., when scanning the first record) for the whole dataset.

The input buffer may be different from the DQS buffer 166. The input buffer may be used to compute the dataset statistics on a certain number of records in advance, so that to have access to expectations for the whole dataset before actually evaluating the first record of the dataset for quality issues. This input buffer will be ahead of N (e.g., 5,000) records from the DQ buffer: The first 5,000 records go in this input buffer used to update the dataset statistics collected for the whole dataset. Once the input buffer is full, the first record of the input buffer is passed to the sampling algorithm (steps 301-303B) for evaluating the score of record 1. That record is removed from the input buffer as it is added in the DQ buffer 166, leaving one space free for record 5001 of the dataset 127 which is then added to the input buffer, which updates the statistics accordingly, and so on.

It may be determined (inquiry 405) whether the input buffer is full or not. If the input buffer is full, the oldest record stored in the input buffer may be identified in step 407 and the data quality violation may be assessed for the oldest record and may be processed as described above with the sampling algorithm (e.g., steps 301-303B). In step 409, the oldest record may be removed from the input buffer. In case (inquiry 411) all records of the dataset are processed, the remaining records in the input buffer may be processed in step 413. In other words, once the last record from the overall dataset 127 is read and put in the input buffer (to update the statistics), there is nothing left to read from the dataset, but there are still all the records which are still in the input buffer and which have not gone yet through step 407 (i.e., sampling algorithm). In step 413, all remaining records from the input buffer go through step 407 until the input buffer is empty.

FIG. 5 shows a simplified structure of a DQ table 501 in accordance with an embodiment of the present invention.

DQ Table 501 may be an auxiliary data structure that contains data quality information corresponding to each record in the DQS buffer as well as summary data quality information for the overall subsample S.

DQ Table 501 stores meta-information on the data quality violations found for each record in the DQS buffer. This information includes a score for every DQ metric 503.1-N applicable for the dataset. It is needed to ascertain whether enough of the records have been collected for each DQ metric 503.1-N. It is also used to assess whether the corresponding DQS record must be kept or it could be omitted from the overall subsample S. Besides the scores for DQ metrics 503.1-N, DQ Table may also contain pointers to the corresponding records in the DQS buffer for more efficient data processing. Whenever a record is selected into or removed from the DQS buffer, a corresponding record is added to or removed from the DQ Table 501.

In addition to the detailed scores (e.g., record score 505) for each record in the DQS buffer, DQ Table 501 also contains the total Metrics Score 507. The Metrics Score maintains the sum of scores for each DQ metric 503.1-N across all records in the current DQS buffer as well as in the subsample S.

In other words, the records that are selected directly into the subsample S do have their score for each DQ metric is a part of the overall Metrics Score.

Each record in the DQS buffer also has a record score 505 in the DQ Table 501. It can be defined as the weighted sum of the scores for a given record where each DQ metric 503.1-N is multiplied by the corresponding DQ metric weight. DQ metric weights may be used to distinguish relevance of different DQ metrics 503.1-N when their usage intent is known prior to sampling. Information about weights can be taken from an Information Governance Catalog by retrieving information about the relevance of attributes and DQ metrics.

In another example of the present disclosure a computer-implemented method for preparing a data sample is provided. The method comprises the following steps:
scanning through a data set record-by-record and carrying out the following steps:
determining a set of interest scores for the current record, the set of
interest scores including an overall record score;
determining whether the current record belongs to a random sample;
in response to the current record belonging to the random sample,
adding the current record to a first set of records, otherwise handling the current record as a candidate record for a second set of records;
forming a second set of records of the candidate records based on the respective sets of interest scores (or solely based on the overall record score) [e.g., by maintaining a buffer of N records and selecting finally the M records having highest interest scores from the buffer]; and
forming the data sample by merging the first set of records and the second set of records.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer program product for data sampling in a storage system, the storage system comprising a dataset comprising records and a buffer, wherein the buffer is a region of a physical memory storage used to temporarily store data while it is being moved from one place to another, the computer program product comprising a computer readable storage medium having program code embodied therewith, the program code comprising the programming instructions for scanning through the dataset record-by-record, the scanning comprising determining whether a current record belongs to a random sample;
in case the current record belonging to the random sample, adding the current record to a first set of records;
in case the current record does not belong to the random sample,
determining at least one storage score for the current record using attribute values of the current record, and storing the storage score in a data table;
determining whether the buffer comprises available size for storing the current record;
in case the buffer comprises the available size, buffering the current record in the buffer;
in case the buffer does not comprise the available size for storing the current record, freeing up at least part of the buffer by determining using storage scores whether at least one previous record of the previously buffered records fulfils a deletion criterion; and
in case the previous record fulfils the deletion criterion, replacing the previous record by the current record in the buffer; and providing the first set of records and at least part of the buffered records as a subsample of the dataset.

2. The computer program product as recited in claim 1, wherein the program code further comprises the programming instructions for:
providing of the subsample in association with metadata indicating whether a record of the subsample is a record of the random sample, and indicating for each buffered record of the subsample attribute values used for determining the storage score.

3. The computer program product as recited in claim 1, wherein the programming instructions for determining that at least one previous record of the previously buffered records fulfils the deletion criterion comprises the programming instructions for:
comparing the storage score of the previous record with the storage score of the current record, and in case the storage score of the previous record is smaller than the storage score of the current record determining that the previous record fulfils the deletion criterion.

4. The computer program product as recited in claim 1, wherein the programming instructions for determining that at least one previous record of the previously buffered records fulfils the deletion criterion comprises the programming instructions for:
selecting a lowest storage score in the data table, comparing the lowest storage score with the storage score of the current record, and in case the lowest storage score of the previous record is smaller than the storage score of the current record, determining that the previous record having the lowest storage score fulfils the deletion criterion.

5. The computer program product as recited in claim 1, wherein the programming instructions for determining that at least one previous record of the previously buffered records fulfils the deletion criterion comprises the programming instructions for:
determining an overall score for the buffered records using the storage scores;
for each record of the buffered records, recalculating the overall score without the storage score of the each record; and
in response to determining that the recalculated overall score is smaller than a predefined threshold, comparing the storage score of the previous record with the storage score of the current record, and in case the storage score of the previous record is smaller than the storage score of the current record, determining that the previous record fulfils the deletion criterion.

6. The computer program product as recited in claim 1, wherein the programming instructions for determining of the storage score for the current record comprises the programming instructions for:
  determining a storage score for each attribute value of the current record, thereby resulting in a set of storage scores of respective attributes of the current record.

7. The computer program product as recited in claim 6, wherein the programming instructions for determining that at least one previous record of the previously buffered records fulfils the deletion criterion comprises the programming instructions for:
  combining the set of storage scores of the current record, and in case each storage score of the set of storage scores of the previous record is smaller than the combined storage score of the current record, determining that the previous record fulfils the deletion criterion.

8. The computer program product as recited in claim 6, wherein the programming instructions for determining that at least one previous record of the previously buffered records fulfils the deletion criterion comprises the programming instructions for:
  in case at least one selected storage score of the set of storage scores of the previous record is smaller than the corresponding storage score of the current record, determining that the previous record fulfils the deletion criterion.

9. The computer program product as recited in claim 1, the dataset being stored in a disk of the storage system.

10. The computer program product as recited in claim 1, wherein the program code further comprises the programming instructions for:
  in case the buffer comprises the available size, buffering the current record in the buffer comprising determining that the storage score of the current record is higher than a predefined threshold and buffering the current record.

11. A system, comprising:
  a memory for storing a computer program for data sampling in a storage system, the storage system comprising a dataset comprising records and a buffer, wherein the buffer is a region of a physical memory storage used to temporarily store data while it is being moved from one place to another; and
  a processor coupled to the memory, wherein the processor is configured to execute the program instructions of the computer program comprising:
    scanning through the dataset record-by-record, the scanning comprising
      determining whether a current record belongs to a random sample,
      in case the current record belonging to the random sample, adding the current record to a first set of records;
      in case the current record does not belong to the random sample,
        determining at least one storage score for the current record using attribute values of the current record, and storing the storage score in a data table;
        determining whether the buffer comprises available size for storing the current record;
        in case the buffer comprises the available size, buffering the current record in the buffer;
        in case the buffer does not comprise the available size for storing the current record, freeing up at least part of the buffer by determining using storage scores whether at least one previous record of the previously buffered records fulfils a deletion criterion; and
        in case the previous record fulfils the deletion criterion, replacing the previous record by the current record in the buffer; and
      providing the first set of records and at least part of the buffered records as a subsample of the dataset.

12. The system as recited in claim 11, wherein the program instructions of the computer program further comprise:
  providing of the subsample in association with metadata indicating whether a record of the subsample is a record of the random sample, and indicating for each buffered record of the subsample attribute values used for determining the storage score.

13. The system as recited in claim 11, wherein the program instructions for determining that at least one previous record of the previously buffered records fulfils the deletion criterion comprise:
  comparing the storage score of the previous record with the storage score of the current record, and in case the storage score of the previous record is smaller than the storage score of the current record determining that the previous record fulfils the deletion criterion.

14. The system as recited in claim 11, wherein the program instructions for determining that at least one previous record of the previously buffered records fulfils the deletion criterion comprise:
  selecting a lowest storage score in the data table, comparing the lowest storage score with the storage score of the current record, and in case the lowest storage score of the previous record is smaller than the storage score of the current record, determining that the previous record having the lowest storage score fulfils the deletion criterion.

15. The system as recited in claim 11, wherein the program instructions for determining that at least one previous record of the previously buffered records fulfils the deletion criterion comprise:
  determining an overall score for the buffered records using the storage scores;
  for each record of the buffered records, recalculating the overall score without the storage score of the each record; and
  in response to determining that the recalculated overall score is smaller than a predefined threshold, comparing the storage score of the previous record with the storage score of the current record, and in case the storage score of the previous record is smaller than the storage score of the current record, determining that the previous record fulfils the deletion criterion.

16. The system as recited in claim 11, wherein the program instructions for determining of the storage score for the current record comprise:
  determining a storage score for each attribute value of the current record, thereby resulting in a set of storage scores of respective attributes of the current record.

17. The system as recited in claim 16, wherein the program instructions for determining that at least one previous record of the previously buffered records fulfils the deletion criterion comprise:
  combining the set of storage scores of the current record, and in case each storage score of the set of storage scores of the previous record is smaller than the combined storage score of the current record, determining that the previous record fulfils the deletion criterion.

18. The system as recited in claim 16, wherein the program instruction for determining that at least one previous record of the previously buffered records fulfils the deletion criterion comprise:

in case at least one selected storage score of the set of storage scores of the previous record is smaller than the corresponding storage score of the current record, determining that the previous record fulfils the deletion criterion.

19. The system as recited in claim 11, the dataset being stored in a disk of the storage system.

20. The system as recited in claim 11, wherein the program instructions of the computer program further comprise:

in case the buffer comprises the available size, buffering the current record in the buffer comprising determining that the storage score of the current record is higher than a predefined threshold and buffering the current record.

* * * * *